United States Patent [19]
Norman

[11] Patent Number: 6,011,802
[45] Date of Patent: Jan. 4, 2000

[54] METHOD AND SYSTEM FOR CONVERSION AND TRANSMISSION OF COMMUNICATION SIGNALS

[75] Inventor: Charles William Norman, Overland Park, Kans.

[73] Assignee: Sprint Communications Co. L.P.

[21] Appl. No.: 08/731,939

[22] Filed: Oct. 22, 1996

[51] Int. Cl.⁷ ........................................ H04J 3/22
[52] U.S. Cl. .................... 370/466; 370/907; 370/539
[58] Field of Search .................. 370/463, 465, 370/466, 467, 505, 506, 907, 401, 537, 538, 539, 541, 542, 543

[56] References Cited

U.S. PATENT DOCUMENTS

| | | |
|---|---|---|
| 4,213,201 | 7/1980 | Gagnier et al. . |
| 5,040,170 | 8/1991 | Upp et al. ................ 370/466 |
| 5,179,548 | 1/1993 | Sandesara et al. . |
| 5,307,353 | 4/1994 | Yamashita et al. . |
| 5,315,594 | 5/1994 | Noser . |
| 5,365,518 | 11/1994 | Noser . |
| 5,390,164 | 2/1995 | Kremer ................ 370/536 |
| 5,416,772 | 5/1995 | Helton et al. . |
| 5,465,252 | 11/1995 | Muller . |
| 5,473,611 | 12/1995 | Gilboa ................... 370/907 |
| 5,526,344 | 6/1996 | Diaz et al. .............. 370/463 |
| 5,550,805 | 8/1996 | Takatori et al. . |
| 5,663,949 | 9/1997 | Ishibashi et al. . |
| 5,857,092 | 1/1999 | Nakamura et al. ........... 395/500 |

*Primary Examiner*—Chau Nguyen
*Attorney, Agent, or Firm*—Harley R. Ball

[57] ABSTRACT

A system and method for conversion and transmission of communication signals converts and grooms communication signals in the synchronous digital hierarchy and synchronous optical network formats at low multiplexing levels. In one embodiment, the system receives tributaries from a primary receiver and multiplexes them so as to embed in a payload the tributaries and lower order path overhead as payload components. The payload is converted to a synchronous optical network format and transmitted in a communication signal. However, the payload components remain in the synchronous digital hierarchy format. A converter assembly receives the communication signal and converts and grooms the payload at a virtual tributary group level to a synchronous digital hierarchy format without changing the payload components embedded therein. The converter assembly delivers the communication signal to a receiver where the payload components can be removed from the payload and delivered to a primary receiver.

4 Claims, 5 Drawing Sheets

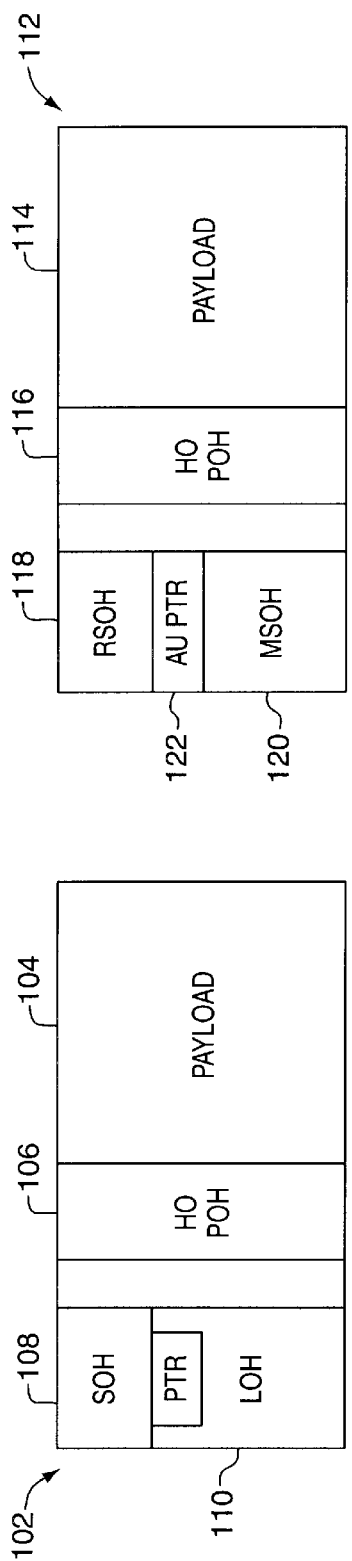
FIG. 2 PRIOR ART
FIG. 1 PRIOR ART
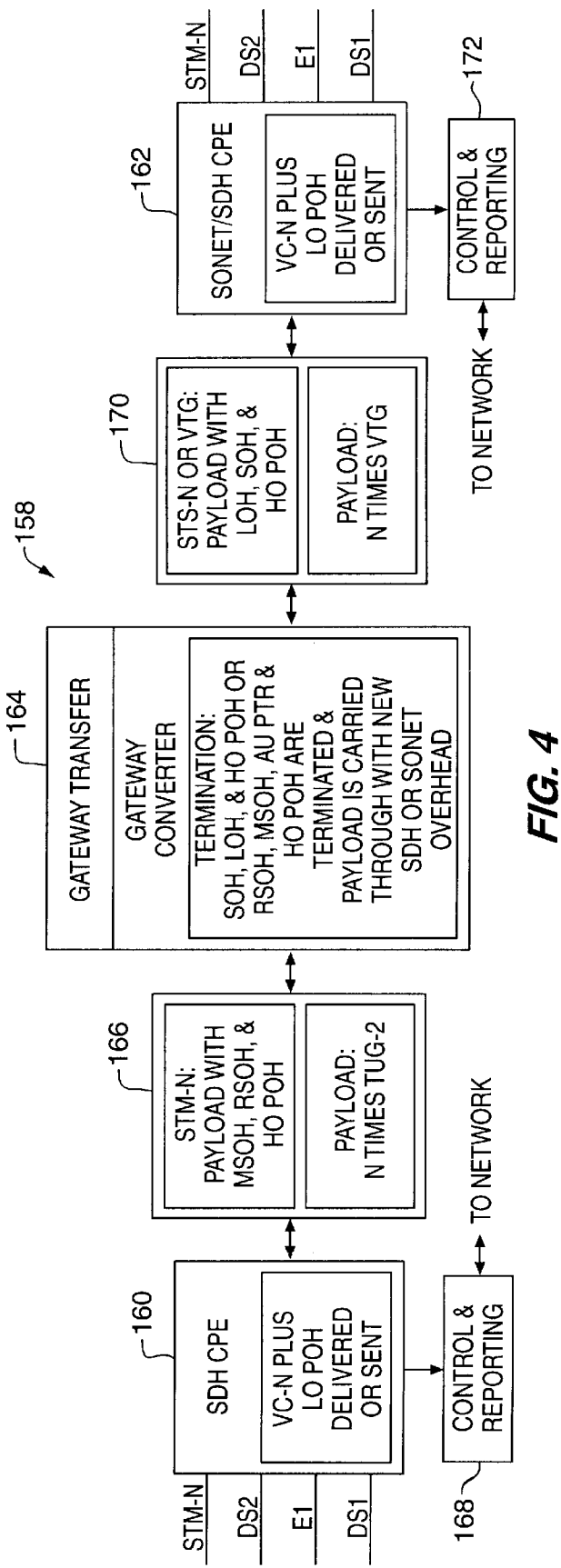
FIG. 4

METHOD AND SYSTEM FOR CONVERSION AND TRANSMISSION OF COMMUNICATION SIGNALS

FIELD OF THE INVENTION

The present invention is directed to a method and a system for transmission and conversion of communication signals between transmitters and receivers having a synchronous digital hierarchy format and transmitters and receivers having a synchronous optical network format.

SUMMARY OF THE INVENTION

In one embodiment, the present invention comprises an apparatus for transmitting a communication signal in a communication network between a transmitter in a synchronous digital hierarchy network and a receiver in a synchronous optical network. The communication signal has a payload with the synchronous digital hierarchy format. The apparatus comprises a converter assembly adapted to receive the communication signal from the transmitter. The converter assembly converts the payload at a tributary unit group level to form a converted payload with the synchronous optical network format. The converter assembly is further adapted to transmit the converted payload to the receiver in a synchronous optical network communication signal.

In another embodiment, the present invention comprises an apparatus for transmitting a communication signal in a communication network between a transmitter in a synchronous optical network and a receiver in a synchronous digital hierarchy network. The communication signal has a payload with a synchronous optical network format. The apparatus comprises a converter assembly adapted to receive the communication signal from the transmitter. The converter assembly converts the payload at a virtual tributary group level to form a converted payload having the synchronous digital hierarchy format. The converter assembly is further adapted to transmit the converted payload to the receiver in a synchronous digital hierarchy communication signal.

In yet another embodiment, the present invention provides an apparatus for transmitting a primary communication signal in a communication network between a transmitter and a receiver. The apparatus comprises a converter assembly adapted to receive the primary communication signal from the transmitter. The converter assembly is further adapted to attach overhead to the primary communication signal to create a payload component. The converter assembly embeds in a payload the payload component containing the primary communication signal. The converter assembly is further adapted to transmit the payload in a synchronous optical network communication signal to the receiver. The payload component embedded in the payload of the synchronous optical network communication signal remains in a synchronous digital hierarchy format.

Still further, the present invention includes an apparatus for transmitting a communication signal in a communication network between a transmitter and a receiver. The transmitter is adapted to transmit a communication signal in a synchronous optical network format. The communication signal has a payload with a payload component embedded therein. The payload has a synchronous optical network format and the payload component has a synchronous digital hierarchy format.

The apparatus comprises a first interface adapted to receive the communication signal from the transmitter. A converter coupled to the first interface is adapted to receive the payload from the first interface and to convert the payload at a virtual tributary group level to form a converted payload having a synchronous digital hierarchy format. The payload component embedded therein remains in the synchronous digital hierarchy format. Also included in the apparatus is a second interface adapted to receive the payload component from the converter and to transmit the payload component from the converted payload to the receiver.

Another aspect of the invention is a system for transmitting a communication signal through a communication network. The system comprises a transmitter adapted to transmit a communication signal in a synchronous digital hierarchy format. A gateway in the system is adapted to receive the communication signal from the transmitter, to convert the communication signal at a tributary unit group level to form a converted communication signal having a synchronous optical network format, and to transmit the converted communication signal. A receiver in the system is adapted to receive the converted communication signal from the gateway.

Yet another embodiment of the present invention is directed to a system for transmitting a communication signal through a communication network. The system comprises a transmitter adapted to transmit a communication signal in a synchronous optical network format. The system has a gateway adapted to receive the communication signal from the transmitter, to convert the communication signal at the virtual tributary group level to form a converted communication signal with a synchronous digital hierarchy format, and to transmit the converted communication signal as a synchronous digital hierarchy communication signal. A receiver in the system is adapted to receive the converted communication signal from the gateway.

In another embodiment of the present invention, a method is provided for transmitting a communication signal in a communication network between a transmitter in a synchronous digital hierarchy network and a receiver in a synchronous optical network. The communication signal has a payload with the synchronous digital hierarchy format. The method comprises converting the payload at a tributary unit group level to form a converted payload with a synchronous optical network format and transmitting the converted payload to the receiver in a synchronous optical network communication signal.

Another method of the present invention is for transmitting a communication signal in a communication network between a transmitter in a synchronous optical network and a receiver in a synchronous digital hierarchy network. The communication signal has a payload with a synchronous optical network format. The method comprises converting the payload at a virtual tributary group level to form a converted payload having the synchronous digital hierarchy format and transmitting the converted payload to the receiver in a synchronous digital hierarchy communication signal.

In yet another embodiment of the present invention, a method is provided for transmitting a primary communication signal in a communication network between a transmitter and a receiver. The method comprises receiving the primary communication signal from the transmitter. Next, overhead is attached to the primary communication signal to create a payload component with a synchronous digital hierarchy format. The method further comprises embedding in a payload the payload component containing the primary communication signal. The payload has the synchronous digital hierarchy format. Next, the payload is converted from the synchronous digital hierarchy format to a synchronous optical network format in such a manner that the payload component remains in the synchronous digital hierarchy format. Then, the payload is transmitted in a synchronous optical network communication signal to the receiver.

In another embodiment, a method is provided for converting a communication signal in a communication network. The method comprises transmitting a communication signal in a synchronous digital hierarchy format from a transmitter. The method further comprises receiving the communication signal and converting the communication signal at a tributary unit group level to form a converted communication signal having a synchronous optical network format. The converted communication signal is transmitted as a synchronous optical network communication signal. The method includes the step of receiving the converted communication signal at a receiver.

In yet another method for converting a communication signal in a communication network, the method comprises transmitting a communication signal in a synchronous optical network format from a transmitter. The method includes receiving the communication signal and converting the communication signal at the virtual tributary group level to form a converted communication signal with a synchronous digital hierarchy format. The method further comprises transmitting the converted communication signal as a synchronous digital hierarchy communication signal. Next, the converted communication signal is received at a receiver.

DESCRIPTION OF THE DRAWINGS

FIG. 1 is a relational diagram of the components of a synchronous optical network communication signal frame.

FIG. 2 is a relational diagram of the components of a synchronous digital hierarchy communication signal frame.

FIG. 4 is a functional diagram of a converter system in accordance with the present invention.

DETAILED DESCRIPTION OF THE PREFERRED EMBODIMENT

Overview of Network Transmission Protocols

Figure 3:
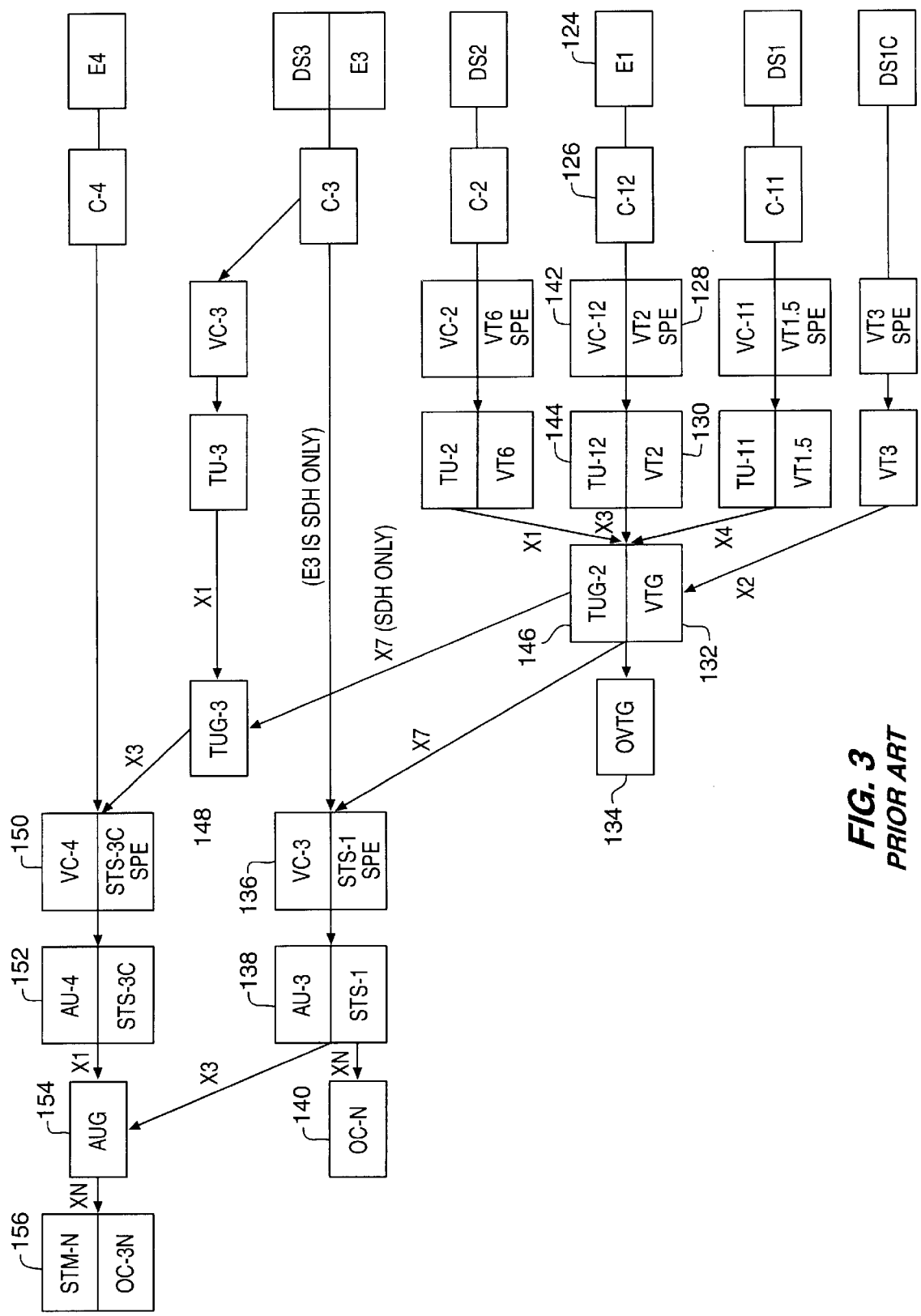
FIG. 3 is a functional diagram of the multiplexing structure of the synchronous optical network communication signal and the synchronous digital hierarchy communication signal.

Synchronous optical network (SONET) and synchronous digital hierarchy (SDH) are standard synchronous transmission protocols that have been developed by the American National Standards Institute (ANSI) and the International Telecommunication Union (ITU). These protocols define how communication signals can be sent on the SONET networks and the SDH networks, respectively. Although the goal of the standards bodies was to make the SONET and SDH systems completely compatible, there are several areas that are not compatible.

One area of incompatibility relates to the types of physical interfaces designated for the SONET and SDH networks. The SONET network allows a physical interface into the SONET system at a synchronous transport signal level one (STS-1) transmission level of 51.84 mega-bits per second (Mbps) (also known as electrical carrier level one (EC-1)), at multiples of STS-1, or at a minimum of a virtual tributary group (VTG) transmission level of 6.312 Mbps. SONET also provides an interface for an optical carrier level one (OC-1) which is the optical equivalent of STS-1, for multiples of OC-1, and for an optical virtual tributary group (OVTG) which is the optical equivalent of VTG.

The SDH network, on the other hand, allows a physical interface into the SDH system at a minimum of a synchronous transport module level one (STM-1) transmission level of 155.52 Mbps or at multiples of STM-1. The STM-1 electrical interface is designated as STM-1e. The STM-1 optical interface is designated as STM-1o. The STM-1 transmission level is the same transmission rate as the SONET STS-3, the STS-3 concatenated (STS-3c), and the optical carrier level three (OC-3).

Although an SDH physical interface standard currently has not been completed for a transmission rate less than STM-1, the ITU currently is considering a physical interface at a tributary unit group-two (TUG-2) transmission level of 6.312 Mbps. This TUG-2 interface will allow delivery of SDH communication signals within the synchronous digital hierarchy at transmission rates that are less than STM-1.

Another incompatible area is the structure of the communication signals. The structure of the SONET communication signal is different than the structure of the SDH communication signal.

A common level of transmission of a SONET communication signal is the STS-1 level. As illustrated in FIG. 1, the SONET STS-1 communication signal has a frame 102 structure. Multiple frames 102 travel in the communication signal. Each frame 102 consists of nine rows (not shown) of ninety bytes each. The first three bytes of each row are allocated to transport overhead. The rest of the frame 102 is allocated for payload 104 and higher order path overhead 106 (HO POH).

The transport overhead is comprised of section overhead 108 (SOH) and line overhead 110 (LOH). The SOH 108 provides operations, administration, and maintenance information (OAM) between regenerators in the SONET network. The LOH 110 provides OAM between add/drop multiplexers in the SONET network. The first three bytes of the first row of the LOH 110 contain administrative unit pointers (PTR). These pointers define the location of the payload information for a frame 102 in a communication signal.

The payload 104 is the information data carried in the frame 102 by the communication signal. The payload 104 is comprised of payload components which are made of virtual tributaries (VTs). The VTs are each comprised of a container and lower order path overhead (LO POH). The LO POH is attached to the container and provides OAM, including error checking and control, for the container. The container contains a primary communication signal such as a tributary communication signal.

The HO POH 106 provides end-to-end OAM support independent of the path taken by the communication signal through the SONET network. The payload 104, together with the HO POH 106, form a synchronous transport signal level one synchronous payload envelope (STS-1 SPE), which has an equivalent speed as a virtual container-three (VC-3).

As illustrated in FIG. 2, the SDH communication signal also has a frame 112 structure. The basic level of transmission of an SDH communication signal is the STM-1 level. Each STM-1 frame 112 consists of nine rows (not shown) of two-hundred-seventy bytes each. The first nine rows of the frame are allocated to section overhead. The rest of the frame is allocated for payload 114 and HO POH 116.

The section overhead contains regenerator section overhead 118 (RSOH), multiplexer section overhead 120 (MSOH), and an administrative unit pointer 122 (AU PTR). The upper three rows of the section overhead are for the RSOH 118, the lower five rows for the MSOH 120, and the fourth row for the AU PTR 122. The RSOH 118 provides OAM between regenerators in the SDH network to raise the transmission reliability therebetween. MSOH 120 provides OAM between add/drop multiplexers in the SDH network to raise the transmission reliability therebetween. The AU PTR 122 is used to monitor the shifting addresses of the first bytes of the VC-3 or virtual container-four (VC-4) level containers that make up the payload 114.

The payload 114 is the information data carried in the frame 112 by the communication signal. The payload 114 is comprised of payload components which are made of virtual containers (VCs). The VCs are each comprised of a container and LO POH. The LO POH is attached to the container and provides OAM, including error checking and control, for the container. The container contains a primary communication signal, such as a tributary communication signal.

The HO POH 116 provides end-to-end OAM support independent of the path taken by the communication signal through the SDH network. The payload 114, together with the HO POH 116, form a virtual container-four (VC-4).

Still another incompatible area is the multiplexing structure levels of SONET and SDH, as illustrated in the combined SONET and SDH multiplexing structures of FIG. 3. Although both SONET and SDH use a synchronous multiplexing structure, SONET uses an administrative unit-three (AU-3) multiplexing structure level while SDH uses an administrative unit-four (AU-4) multiplexing structure level.

The base unit of both multiplexing structures is a primary communication signal such as a tributary communication signal. A tributary communication signal is a communication signal from a plesiochronous digital hierarchy (PDH) network. For example, a tributary may be a digital signal level one (DS1) 1.544 Mbps North American communication signal or a European level one (E1) 2.048 European communication signal.

In the SONET network, tributary communication signals are mapped into containers. LO POH is added to the containers to create virtual tributary synchronous payload envelopes (VT SPEs). The VT SPEs are processed with pointers to become virtual tributaries (VTs) and then multiplexed to a VTG.

The VTG, with SOH, LOH and HO POH can be transmitted out of the network. Alternatively, the VTG can be further multiplexed and added together with HO POH to become an STS-1 SPE. Adding SOH and LOH to the STS-1 SPE creates an STS-1 communication signal.

The STS-1 may be multiplexed or concatenated before adding the SOH and LOH to form an STS-N. As used herein in a communication signal designation, "N" means any number from zero to infinity of any hypothetical multiplexing level for any communication signal or communication signal component, including SONET and SDH multiplexing levels. In the SONET multiplexing structure, the lowest multiplexing level is the tributary. The highest multiplexing level is the STS-N or the OC-N optical equivalent. The STS-N may be transmitted to the SONET network as either the electrical STS-N (EC-N) or as an OC-N communication signal.

For example, as illustrated in the SONET and SDH multiplexing structures in FIG. 3, an E1 tributary communication signal 124 transmitting at 2.048 Mbps may enter into the SONET network. The E1 is mapped into a level twelve container 126 (C-12). A LO POH is added to the C-12 126, creating a virtual tributary-two synchronous payload envelope 128 (VT2 SPE). A pointer is added to the VT2 SPE 128, thereby making a virtual tributary-two 130 (VT2) level. Three VT2 signals may be multiplexed to create a VTG 132 which is transmitted at 6.312 Mbps.

The VTG 132 may then be transmitted out of the SONET network at an electrical VTG physical interface or at an OVTG 134 physical interface after HO POH, SOH, and LOH have been added to the VTG 132. Alternatively, seven VTGs can be multiplexed to form an STS-1 SPE 136. HO POH, SOH, and LOH are added to the STS-1 SPE 136, thereby making it an STS-1 138 51.84 Mbps communication signal 138. The STS-1 138 is at the AU-3 multiplexing level and is the standard rate for communication signal transmission.

The STS-1 138 can be transmitted as an STS-1 electrical signal from an STS-1 physical interface. Alternatively, the STS-1 138 can be converted to an OC-1 optical signal and transmitted out of an OC-1 physical interface. In addition, N number of STS-1 signals may be multiplexed up to an STS-N communication signal and transmitted either as an STS-N electrical communication signal or as an OC-N 140 optical communication signal.

In a special variant of the STS-1 signal, three STS-1 SPEs can be merged or concatenated together to form one large SPE. Because there is only one SPE, only one each of SOH, LOH, and HO POH is required for the signal. This leaves valuable payload capacity available for a usable bandwidth of 149.76 Mbps. This signal is known as a synchronous transport signal level three concatenated (STS-3c) signal. Likewise, twelve STS-1 SPEs can be concatenated to form an synchronous transport signal level twelve concatenated (STS-12c) signal.

The SDH multiplexing structure is significantly different than the SONET multiplexing structure. In the SDH network, tributaries are mapped into containers and then LO POH is added to create VCs. The VCs are aligned with pointers on a tributary unit (TU) basis and multiplexed into groups of tributary unit groups (TUGs). HO POH is added to the TUGs to create a VC-4. The VC-4 is aligned with pointers on an administrative unit (AU) basis. The AUs are multiplexed into administrative unit groups (AUG), and the AUGs are processed with RSOH and MSOH to form an STM-1. The AUG can be multiplexed prior to adding RSOH and MSOH to form an STM-N.

In the SDH multiplexing structure, the lowest multiplexing level is the tributary. The highest multiplexing level is the STM-N.

For example, referring again to FIG. 3, the same E1 124 tributary communication signal could enter into the SDH network from the PDH network. The E1 is mapped into a C-12 126. A LO POH is added to the C-12 126, creating a virtual container-twelve 142 (VC-12). A pointer is added to the VC 12 142, thereby making a tributary unit-twelve 144 (TU-12). Three TU-12s are multiplexed to create a TUG-2 which is transmitted at 6.312 Mbps.

Seven TUG-2s 146 can be multiplexed to form a tributary unit group-three 148 (TUG-3). Three TUG-3s are multiplexed together and HO POH is added to form a VC-4 150. A pointer is added to the VC-4 150 to form an AU-4 152. The AU-4 152 is multiplexed up to an AUG 154. RSOH and MSOH are added to the AUG 154 to form an STM-1. Alternatively, N AUGs may be multiplexed together and added to RSOH and MSOH to form an STM-N communication signal 156.

The STM-1 can be transmitted as an STM-1 electrical signal from an STM-1e electrical physical interface. Alternatively the STM-1 can be converted to an optical signal and transmitted out of an STM-1o optical physical interface.

In SDH standards, three VC-12s are combined to form a TUG-2, and seven TUG-2s are combined to form a TUG-3. Thus, twenty-one VC-12s are bundled together into the TUG-3. This bundle follows the VC-4 mapping path and is further multiplexed into an STM-1.

However, SONET standards use the VC-3 mapping path in which three VT2 SPEs are combined to form a VTG, and seven VTGs are combined to form one STS-1 SPE. Thus, twenty-one VT2 SPEs are bundled together to form one STS-1 SPE.

According to the standards bodies, conversion from AU-4 to AU-3 is the responsibility of the SONET networks. Therefore, if a SONET network carries an SDH communication signal, conversion of the communication signal from the SONET format to the SDH format is required to be performed by the SONET network. Likewise, if a SONET communication signal is to be carried on an SDH network, the communication signal must be converted to the SDH format by the SONET network.

It will be appreciated that the incompatibilities of the SONET and SDH communication signals result in special obstacles that must be overcome when transferring a communication signal between an SDH network and a SONET network. Transferring a communication signal requires conversion between an STM-N communication signal and an STS-N or VTG communication signal and transmission of the converted communication signals at the STM-N, STS-N, or VTG level. To convert a communication signal between an SDH format and a SONET format, the overhead and pointers must be translated, and the hierarchy must be re-mapped.

Transporting a complete STM communication signal as STS-3c signals, or even as groups of three STS-1 signals, without grooming at a lower multiplexing level, is costly. To transport signals in such a manner, a transmitting purchaser must purchase a complete STS-3c or three STS-1s.

Alternatively, the STS-3c signal or the STS-1s must be routed to a standard location, broken down, recombined, and then re-transmitted to the final destination. Routing traffic to a standard location which is not the final destination is also costly.

Under current constraints, the smallest bundle of VTs, such as VT2s, that can be routed between an SDH network and a SONET network is at the STS-3c level. Thus, conversion from SDH to SONET and grooming occurs at the STS level. Of course, it would be more efficient to convert, groom, and route smaller bundles.

The present invention meets this need by providing a system that allows a communication signal to be converted and transmitted at a multiplexing level that is lower than the STM-N level for SDH networks and lower than the STS level for SONET networks. Because the TUG-2/VTG levels are a common denominator between the SDH and SONET networks, the present invention provides for conversion at the TUG-2/VTG levels. In addition, the system provides for grooming at the TUG-2/VTG level. That is, the system will sort signals that have been broken down or demultiplexed into TUG-2, VTG, or other component parts so that like signal components may be regrouped and transmitted to a location that is the same destination for the like signal components.

Moreover, the system of the present invention provides end-to-end delivery of payload components in the SDH format. In one embodiment of the present invention, the payload of a communication signal is converted into a SONET format while leaving the payload components, such as the VC-12s with their LO POHs, of the payload in the SDH format. In this manner, the receiver that receives the communication signal can re-map the payload to the SDH format and retrieve the payload components that have remained in the SDH format.

The system of this invention has the ability to terminate a physical SONET communication signal and demultiplex the communication signal in the SDH format to receive the payload components. The payload components, including the LO POH, are carried transparently in the communication signal. Thus, the primary receiver retrieves the original primary communication signals, such as the tributary communication signals, and the path overhead, thereby providing end-to-end performance monitoring for the tributary communication signals.

An efficeint common multiplexing level between the SDH and SONET networks is at the TUG-2/VTG level. Thus, to be able to convert an SDH communication signal to a SONET communication signal, and to provide grooming and routing at a low multiplexing level, standards conversion is preferably performed at the TUG-2/VTG level. However, it will be understood that conversion may be done at a lower level such as, for example, a TU, a VC, or a container level, depending on the tributaries which are a part of the signal.

Gateway System Overview

Tuning now to FIG. 4 there is shown therein a communication signal transfer system in accordance with the present invention and designated generally by the reference numeral 158. The transfer system 158 is adapted for use with a communication network comprising an SDH network and a SONET network.

The transfer system 158 has an SDH transmitter/receiver, such as an SDH customer premise equipment 160 (CPE), a SONET transmitter/receiver, such as a SONET customer premise equipment 162 (CPE). The SDH CPE 160 and the SONET CPE 162 communicate through a gateway 164.

The SDH CPE 160 exists in the SDH network portion of the communication network. The SDH CPE 160 receives primary communication signals, such as tributary communication signals, into the SDH network from a primary transmitter (not shown). The primary communication signals can be, for example, DS1, E1, DS2, STM-N, or others. The SDH CPE 160 maps the tributaries into containers and adds LO POH to the containers to get VC-N units. The LO POH is OAM which provides error checking and other control and reporting information to a primary receiver (not shown) of the VC-N. The VC-N units, including the LO POH, constitute payload components which are multiplexed into a payload. The payload is transmitted as an SDH payload with SDH RSOH, MSOH, AU pointers, and HO POH in an SDH communication signal 166 on the SDH network.

The payload capacity may be variable, depending on the specification of the SDH network. Referring still to FIG. 4, N number of TUG-2s are multiplexed together to form a payload for the SDH communication signal 166. For example, for an STM-1 payload, twenty-one TUG-2 level signals are multiplexed together to form the payload. However, an STM-4 or STM-16 may be sent as well. For either the STM-4 or the STM-16, a higher number of TUG-2s will be multiplexed together. In addition, any STM-N signal may contain one or more TUG-3s which originated as a C3 or one or more VC-4s which originated as a C4.

It will be evident that, as well as being able to transmit an SDH communication signal 166, the SDH CPE 160 can receive an SDH communication signal 166 and deliver the payload components as tributary communication signals. When the SDH CPE 160 receives the SDH communication signal 166, the SDH CPE 160 strips the HO POH, RSOH, and MSOH to get the payload. The SDH CPE 106 uses the overhead to provide OAM for the signal, thereby providing control and reporting signals 168 to the communication network.

The SDH CPE 160 demultiplexes the payload into the payload components. The payload components are comprised of VC-N signals, including the LO POH attached to each container in the VC-N. The SDH CPE 160 delivers the VC-N signals to their respective primary receivers (not shown) as tributary communication signals with LO POH. The LO POH allows the receivers to gain OAM about the tributary communication signal. Because OAM from the LO POH originates with that tributary communication signals in the VC from the primary transmitter, the primary receiver gains end-to-end performance monitoring of the tributary communication signal.

In the same manner, a SONET CPE 162 exists in the SONET network portion of the communication network. The SONET CPE 162 can receive one or more primary communication signals, such as a DS1, E1, DS2, and STM-N, from a primary transmitter (not shown). Each signal is received by the SONET CPE 162 as a tributary. The SONET CPE 162 maps the tributary communication signal into a container and adds LO POH to the container to get a VC-N unit.

The VC-N, including the LO POH, constitutes a payload component. This payload component is then multiplexed to form a TUG-2. The TUG-2 is converted to the SONET format of the VTG. This involves mapping the TUG-2 to a VTG.

Although the TUG-2 is mapped to the VTG, the payload components remain unaffected. Thus, when the communication signal eventually is converted to the SDH format and then reaches a destination, such as the SDH CPE 160, the communication signal can be demultiplexed and the payload components will be intact in the SDH format. The LO POH tributary communication signal then may be removed from the VC-N and sent to the primary receiver (not shown). In this manner, end-to-end OAM is sent with the tributary signal for performance monitoring.

The VTG can be transmitted out of the SONET CPE 162 as a SONET communication signal 170. If the VTG is to be transmitted, the VTG will be the payload. HO POH, SOH, and LOH are added to the VTG to complete the SONET communication signal 170. Then, the VTG may be transmitted as an electrical signal from a physical VTG interface or as an optical signal from an OVTG interface.

Alternatively, VTGs can be multiplexed together and HO POH added to create an STS-1 SPE. SOH and LOH are added and the SONET CPE 162 can output an STS-1 as the SONET communication signal 170. In addition, N STS SPEs can be multiplexed to create an STS-N SONET communication signal 170. The SONET CPE 162 then may transmit the signal either as an electrical STS-N from an electrical STS-N physical interface or as an OC-N from an OC-N physical interface. If any problems occur in the conversion or the transmission of the signal, the SONET CPE can notify the communication network through the control and reporting 172 mechanism.

With continued reference to FIG. 4, both the SONET CPE 162 and the SDH CPE 160 are in operative communication with the gateway 164. The gateway 164 converts the SDH communication signal 166 into a SONET communication signal 170 or converts the SONET communication signal 170 into an SDH communication signal 166.

The gateway 164 converts an SDH communication signal 166 at the TUG-2 level. The SDH communication signal 166 is received by the gateway 164. The RSOH and MSOH from the SDH communication signal 166 are terminated. The HO POH is converted from the SDH format to the SONET format. Then, the payload is demultiplexed to the TUG-2 level. The multiple TUG-2s are mapped to VTGs and groomed so that they are sorted for similar destinations. The groomed VTGs are remultiplexed to form a payload. SOH, LOH, and the converted HO POH are added to the payload. The new SONET communication signal 170 then is transmitted to the SONET CPE 162.

The gateway 164 converts a SONET communication signal 170 at the VTG level. The SONET communication signal 170 is received by the gateway 164. The SOH and LOH of the SONET communication signal 170 are terminated. The HO POH is converted from the SONET format to the SDH format. The payload is demultiplexed to the VTG level and mapped to the TUG-2 format. The TUG-2s are groomed and remultiplexed to form a payload. RSOH, MSOH, and the converted HO POH are added to the payload to form the SDH communication signal 166. The new SDH communication signal 166 is then transmitted to the SDH CPE 162.

The gateway 164 has a special transfer function. Instead of demultiplexing an SDH communication signal 166 down to the TUG-2 level and converting it, the gateway 164 can reduce the SDH communication signal 166 to a nearly equivalent concatenated SONET communication signal 170. For example, the gateway can receive an STM-1 or STM-N communication signal and convert it to an STS-3c or STS-3cN communication signal that can travel over the SONET network. This involves changing the two "ss" bits in the overhead. The ss bits are the number five and number six bits in the H1, H2, and H3 MSOH SDH bytes and SONET LOH bytes, respectively. In addition, it is preferred that the HO POH is converted, byte-by-byte, to the SONET format.

Similarly, the transfer function converts an STS-3c to an STM-1, including multiples of each. The ss bits are changed to the SDH format, and preferably the HO POH is converted, byte-by-byte, to the SDH format.

SONET CPE

Figure 5:
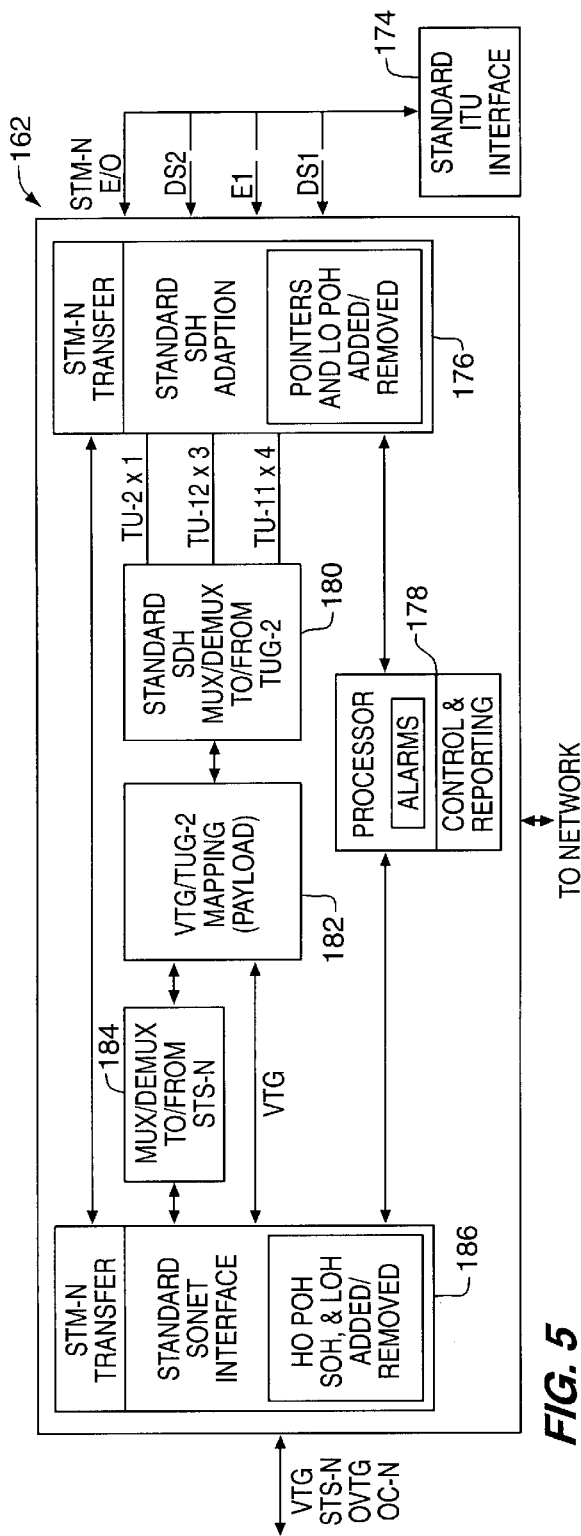
FIG. 5 is a block diagram of a synchronous optical network transmitter/receiver in accordance with the present invention.

The SONET CPE 162 is illustrated in detail in FIG. 5. The SONET CPE 162 receives a primary communication signal, such as a tributary communication signal, from a primary transmitter through a standard ITU interface 174 and outputs the primary communication signal in a SONET communication signal. The standard ITU interface 174 provides connectivity to PDH communication signals. Preferably, the SONET CPE 162 can receive DS1, E1, and DS2 tributary signals.

The tributary communication signal enters an SDH adapter 176 which provides standard SDH adaptation. The SDH adapter 176 is in communication with a processor 178 which monitors and controls the conversion and reports errors in the conversion to the SONET network. The processor 178 can use, for example, a standard X.25 interface or an IEEE 802.3 standard interface to communicate to the SONET network.

The SDH adapter 176 maps the tributary communication signal to a container and adds LO POH to the container, creating a VC. The resultant VC is a payload component that will be received at the primary receiver (not shown) destination. Because the payload component has the tributary data and the LO POH, the primary receiver receives not only the tributary data, but also the performance monitoring OAM in the LO POH that is associated with the tributary data.

The SDH adapter 176 adds pointers to the VC, thereby creating a TU. The TUs are multiplexed in a multiplexer 180 to a TUG-2. For example, one TU-2, three TU-12s, or four TU-11s can be multiplexed to form a TUG-2.

The TUG-2 then is converted to a VTG in the converter 182. The conversion from the TUG-2 to the VTG involves mapping the TUG-2 to the VTG frame format. Mapping occurs at the TUG-2 level so that the payload components are not disturbed from their SDH format. Thus, if, for example, the signal is delivered to a European primary receiver, that primary receiver will not have to do any conversion to the payload components.

Preferably, the SONET CPE 162 can transmit the communication signal into the SONET network at the VTG level. The converter 182 then would transmit the VTG as a payload to the SONET interface 186 for transmission to the SONET network.

The SONET CPE 162 can transmit a SONET communication signal in an STS-N format. If this occurs, the VTG is transmitted to a second multiplexer 184 which will multiplex multiple VTGs to the required STS-N level. For example, seven VTGs may be multiplexed to get to an STS-1 level transmission. The STS-N payload then is transmitted from the second multiplexer 184 to the SONET interface 186 for transmission to the SONET network.

Referring still to FIG. 5, the SONET interface 186 prepares the payload for transmission to the SONET network. The SONET interface 186 is connected to the processor 178 which controls the conversion and transmission of the communication signal. The SONET interface 186 adds HO POH, SOH, and LOH to the payload to create a SONET communication signal. Pointers are contained in the LOH.

The SONET interface 186 can transmit the SONET communication signal from many interfaces. Preferably, the SONET interface 186 can transfer the SONET communication signal as an electrical STS-N signal from an electrical STS-N interface, an OC-N signal from an OC-N interface, an electrical VTG signal from an electrical VTG physical interface, and as an optical VTG signal from an OVTG physical interface. If any errors occur in the creation of the SONET communication signal or its transmission, the processor 178 transmits error reporting to the SONET network.

In addition, in the preferred design, the SONET CPE 162 has a special transfer function whereby the SONET CPE 162 can receive an STM-N signal. The STM-N can be either an STM-Ne (electrical) or an STM-No (optical) signal. The transfer function can transmit the STM-N as an STS-3cN. For example, an STM-1 can be converted to an STS-3c. In such a case, the STM-N would be received by the SONET CPE 162 at the SDH adapter 176 through either the ITU interface 174 or some other appropriate device. The SDH adapter 176 transfers the STM-N signal to the SONET interface 186. Either the SDH adapter 176 or the SONET interface 186 can convert the STM-N to an STS-3cN by changing the "ss" bits and preferably the HO POH. Preferably, the SONET interface 186 makes the conversion.

In the optimal design, the SONET CPE 162 also receives a SONET communication signal, such as the SONET communication signal 170 of FIG. 4, as an STS-N signal, an OC-N signal, an OVTG signal, or a VTG signal from the SONET network. The SONET communication signal is received by the SONET interface 186. The processor 178, which is in communication with at least the SONET interface 186 and the SDH adapter 176, controls the conversion and transmission of the communication signal to one or more primary receivers (not shown).

The SONET interface 186 strips the HO POH, the SOH, and the LOH from the payload. If the payload is an STS-N level payload, the payload is transferred to the multiplexer/demultiplex 184 to be demultiplexed to the VTG level. Then, the VTGs are transferred to the converter 182. If the payload is at the VTG level when at the SONET interface 186, it can be either passed through the multiplexer/demultiplexer 184 or passed directly to the converter 182. Preferably, the VTG payload is passed directly to the converter 182.

At the converter 182, the VTGs are converted or mapped to TUG-2s. The TUG-2s are demultiplexed at the multiplexer/demultiplexer 180 and sent to the SDH adapter 176 as payload components. The SDH adapter 176 separates the payload components into the tributary communication signals and the LO POHs and transmits the tributary communication signals and the LO POHs to primary receivers (not shown) through the standard ITU interface 174. If any errors occur in the conversion or transmission to a primary receiver, the processor 178 notifies the SONET network.

In the embodiment of FIG. 5, the SONET CPE 162 can deliver a primary communication signal, such as a tributary communication signal, to a primary receiver as a DS2, an E1, and a DS1. The SONET CPE 162 also can deliver a primary communication signal to a primary receiver as an STM-N (electrical or optical). In addition, the SONET CPE 162 can be configured to demultiplex the STM-N into components, groom the components at the TUG-2 level or other appropriate level, such as VC-12, remultiplex the groomed components with or without other components, and transmit the multiplexed components to a primary receiver.

The transfer function receives an STS-3cN and transmits the STS-3cN to a primary receiver as an STM-N. In such a case, the STM-3cN is received by the SONET interface 186. The SONET interface 186 transfers the STS-3cN to the SDH adapter 176. Either the SDH adapter 176 or the SONET interface 186 converts the STS-3cN to an STM-N by changing the "ss" bits and preferably the HO POH. Preferably, the SONET interface 186 makes the conversion. The converted STM-N is transmitted to the primary receiver by the SDH adapter 176 through either the ITU interface 174 or some other appropriate device.

Figure 6:
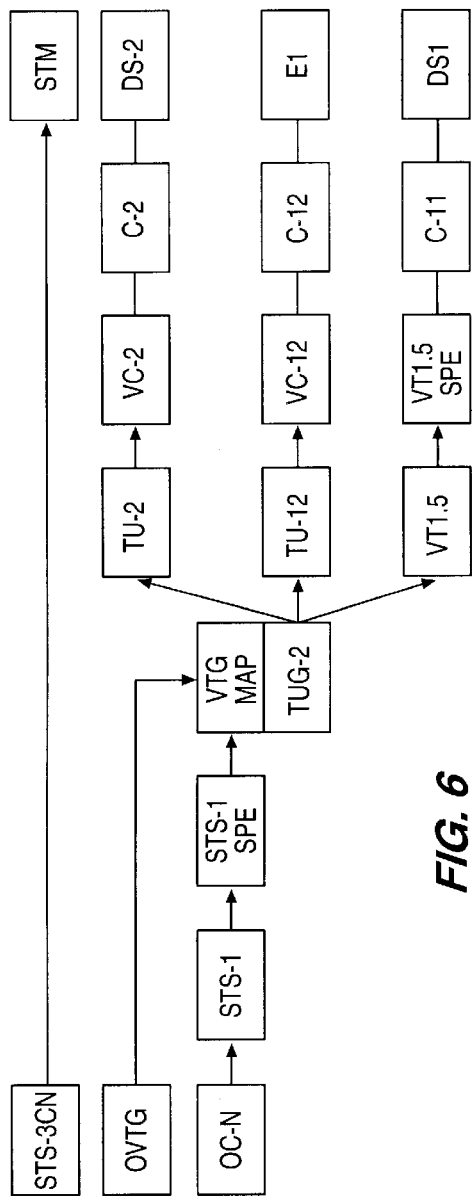
FIG. 6 is a functional diagram of a multiplexing structure for the synchronous optical network transmitter/receiver of FIG. 5.

The multiplexing/demultiplexing structure of the SONET CPE 162 is illustrated in FIG. 6. The arrows of FIG. 6 illustrate that the flow of conversion in the SONET CPE 162 is for a communication signal received through the SONET network and delivered to a primary receiver as a tributary communication signal. However, it will be appreciated that the SONET CPE 162 can convert communication signals in the opposite direction for a tributary communication signal received by the SONET CPE 162 to be transmitted to the SONET network.

SDH CPE

Figure 7:
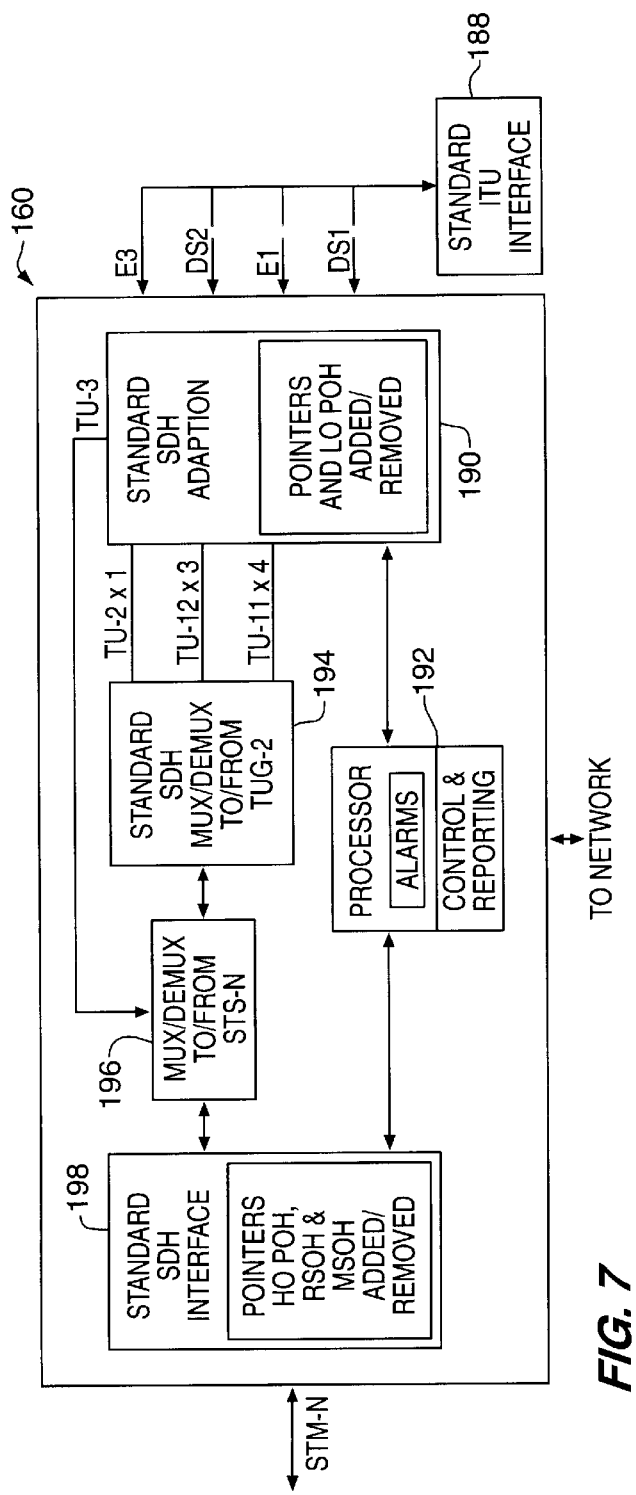
FIG. 7 is a block diagram of a synchronous digital hierarchy transmitter/receiver in accordance with the present invention.

As illustrated in FIG. 7, the preferred SDH CPE 160 receives a primary communication signal, such as a tributary communication signal, through a standard ITU interface 188 and outputs the tributary communication signal in an SDH communication signal, such as the SDH communication signal 166 (see FIG. 4). The SDH CPE 160 can receive DS1, E1, DS2, and European level three (E3) communication tributary signals. The tributary enters an SDH adapter 190 which provides standard SDH adaptation. The SDH adapter 190 is in communication with a processor 192 which controls the conversion and reports errors in the conversion to the SONET network. The processor 192 can use, for example, a standard X.25 interface or an IEEE 802.3 standard interface to communicate to the SDH network.

The SDH adapter 190 maps the tributary communication signal to a container and adds LO POH to the container, creating a VC. The resultant VC is a payload component that will be received at the primary receiver destination (not shown).

Pointers are added to the VC, thereby creating a TU. The TUs are multiplexed in a multiplexer/demultiplexer 194 to a TUG-2. For example, one TU-2, three TU-12s, or four TU-11s can be multiplexed to form a TUG-2. The TUG-2 then is multiplexed to an STM-N level payload. If the tributary communication signal is an E3, however, a TU-3 will not be multiplexed to a TUG-2, but will follow the path to the STM-N payload through a TUG-3. The multiplexing to the STM-N payload for the TU-3 and the TUG-2 either can be done in the first multiplexer/demultiplexer 194 or in a second multiplexer/demultiplexer 196. Preferably, it is done in a second multiplexer/de-multiplexer 196.

The payload is transferred to an SDH interface 198. The SDH interface 198 prepares the payload for transmission to the SDH network. As shown in FIG. 7, the SDH interface 198 is connected to the processor 192 which controls the building and transmission of the communication signal. The SDH interface 198 adds HO POH, RSOH, and MSOH and pointers to the payload to create an SDH communication signal. If errors occur in the creation or transmission of the interface, the processor 192 reports the errors to the SDH network.

The SDH interface 198 can transmit the SDH communication signal from many interfaces. Preferably, the SDH interface 198 transfers the SDH communication signal as an electrical STM-N signal from an electrical STM-N interface or as an optical STM-N signal from an optical STM-N interface.

It will be recognized that an SDH communication signal can be received by the SDH CPE 160 and delivered to a primary receiver as a tributary. As illustrated in FIG. 7, the SDH CPE 160 can receive either an electrical or optical STM-N signal. In addition, a TUG-2 level signal may be received. The SDH interface 198 receives the SDH communication signal. At least the SDH interface 198 and the SDH adapter 190 are in communication with the processor 192 which controls the conversion and transmission of the communication signal to one or more primary receivers (not shown).

The SDH interface 198 strips the HO POH, the RSOH, the MSOH, and the AU PTR from the payload. If the payload is an STM-N level payload, the payload is transferred to the multiplexer/demultiplexer 196 to be demultiplexed to the TUG-2 level. The TUG-2s are then passed to a second multiplexer/demultiplexer 194 to be demultiplexed to the VC payload components. Alternatively, the TUG-2s can be demultiplexed in the first multiplexer/demultiplexer 196 to the VCs, and the second multiplexer/demultiplexer 194 would not be needed.

If the payload is at the TUG-2 level when at the SDH interface 198, it can be passed through the multiplexer/demultiplexer 196 or passed directly to the second multiplexer/demultiplex 194. Preferably, the TUG-2 payload is passed directly to the second multiplexer/demultiplexer 194. If the payload is to be demultiplexed into a TU-3, preferably it will be transmitted from the SDH interface 198 to the SDH adapter 190.

Once the payload has been demultiplexed to the VC-N level, the tributary communication signals are separated from the LO POH by the SDH adapter 190. The SDH adapter 190 sends the tributary communication signals to the primary receivers with the LO POH for performance monitoring. Preferably, the SDH CPE 160 can deliver a communication signal to a primary receiver as an E3, DS2, E1, or DS1 tributary signal.

Figure 8:
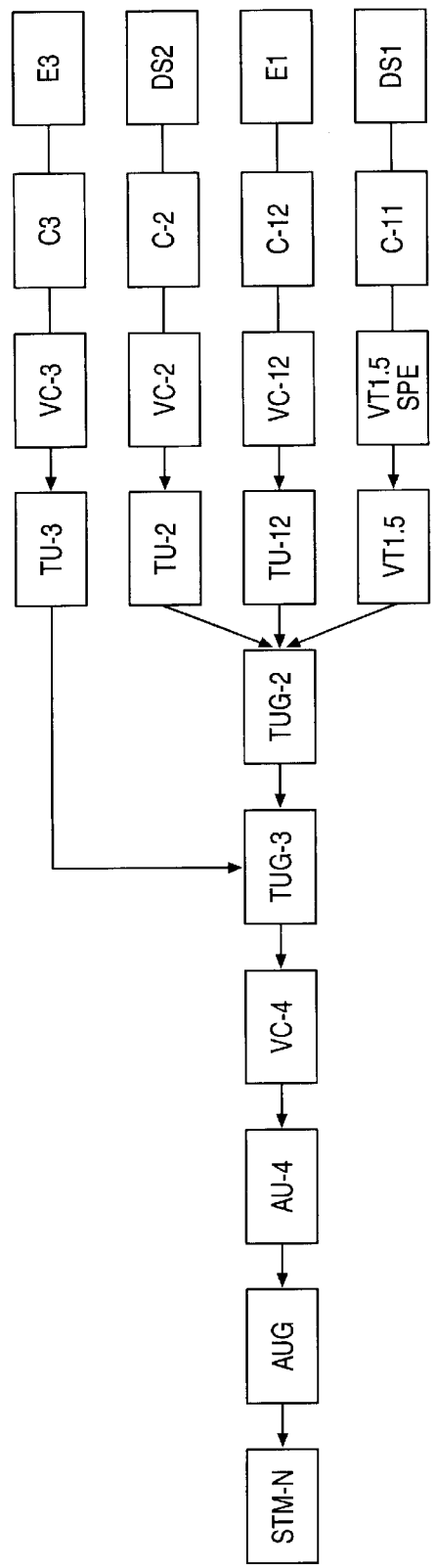
FIG. 8 is a functional diagram of a multiplexing structure for the synchronous digital hierarchy transmitter/receiver of FIG. 7.

The multiplexing/demultiplexing structure of the SDH CPE 160 is illustrated in FIG. 8. The arrows of FIG. 8 illustrate that the flow of conversion in the SDH CPE 160 is for a communication signal received by a primary transmitter as a tributary communication signal and delivered to the SDH network. However, it will be appreciated that the SDH CPE 160 can convert communication signals in the opposite direction for an SDH communication signal received by the SDH CPE 160 to be transmitted to a primary receiver as a tributary communication signal.

Gateway

Figure 9:
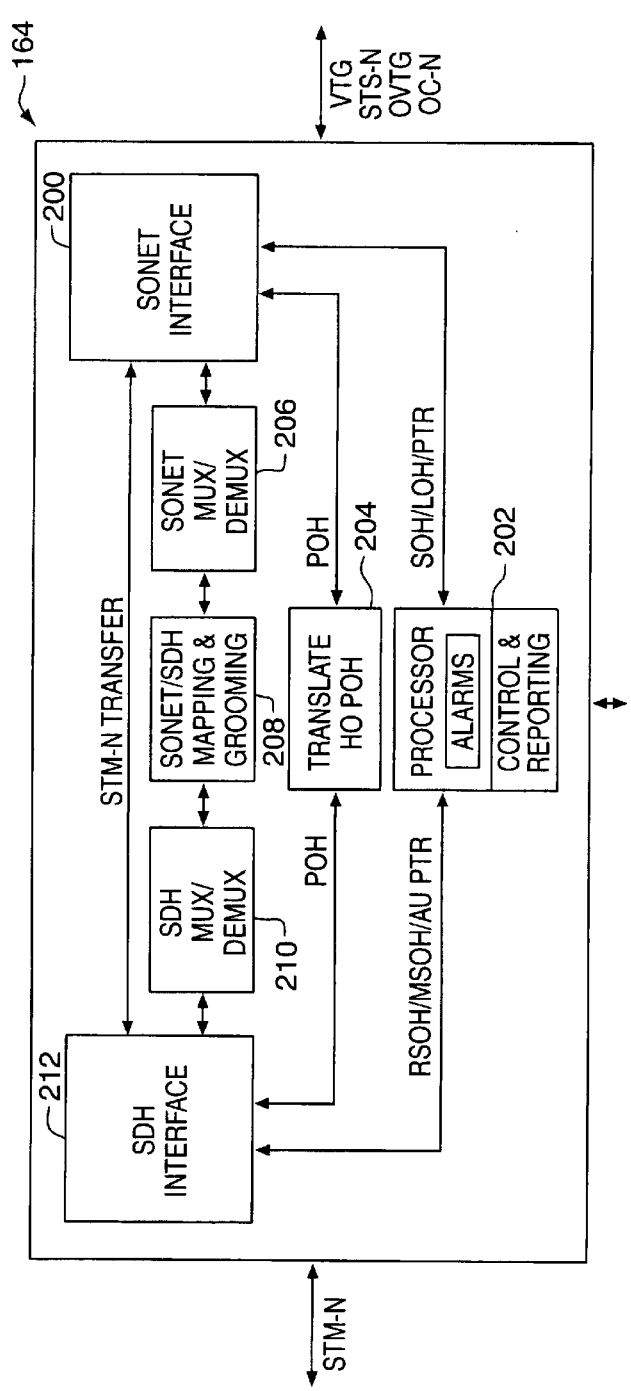
FIG. 9 is a block diagram of a synchronous optical network-synchronous digital hierarchy converter in accordance with the present invention.

Turning now to FIG. 9, there is illustrated a gateway 164 constructed in accordance with the present invention. The gateway 164 converts a SONET communication signal to an SDH communication signal and provides the conversion and grooming of the payload. In the embodiment of FIG. 9, conversion and grooming of a SONET communication signal occurs at the VTG level. However, conversion and grooming could occur at a lower multiplexing level, such as a VT2 SPE, or other appropriate multiplexing level.

The gateway receives a SONET communication signal in an STS-N format, an OC-N format, a VTG format, or an OVTG format. The SONET communication signal is received at the SONET interface 200. If the SONET communication signal is optical, the SONET interface 200 will convert it to an electrical signal.

The SONET interface 200 is connected to a processor 202 which controls the conversion process and reports errors in the conversion to the communication network. The processor 202 can use, for example, a standard X.25 interface or an IEEE 802.3 standard interface to communicate to the communication network.

The SONET interface 200 separates the HO POH, SOH, and LOH from the payload. The HO POH is sent to a translator 204 where it is translated from the SONET format to the SDH format. The SOH and LOH are terminated, and the processor 202 generates RSOH, MSOH, and an AU PTR for the SDH network.

From the SONET interface 200, the SONET payload is transmitted to a multiplexer/demultiplexer 206 as shown in FIG. 9. The multiplexer/demultiplexer 206 will demultiplex an STS-N level communication signal (or converted equivalent optical signal) to the VTG level. Then, the VTG is transmitted from the multiplexer/demultiplexer 206 to the converter 208. It will be recognized that a VTG level payload from a VTG or OVTG level communication signal will not require demultiplexing and can pass through the demultiplexer 206 unchanged or pass directly from the SONET interface 200 to the converter 208. Preferably, the VTG level communication signal is passed directly from the SONET interface 200 to the converter 208.

The converter 208 converts or maps the VTGs to TUG-2s. In addition, preferably the converter 208 grooms the TUG-2s, thereby organizing them into "groups" that may be delivered to the same, similar, or close location or region. Alternately, grooming can occur before the VTGs are converted to TUG-2s. The TUG-2s then are multiplexed in the multiplexer/demultiplexer 210 to an STM-N level payload. The payload is sent to the SDH interface 212.

Referring still to FIG. 9, the SDH interface 212 is connected to the processor 202 which controls the creation and transmission of the SDH communication signal. The SDH interface 212 adds the translated HO POH, the RSOH, the MSOH, and the AU PTR to the payload to create an SDH communication signal. The SDH interface 212 then outputs the SDH communication signal to the SDH network. Preferably, the SDH communication signal is transmitted as an STM-N signal.

Currently standards bodies are defining a TUG-2 level physical interface. It will be recognized that the gateway 164 may be modified to incorporate or include a TUG-2 interface so that the gateway 164 can output a TUG-2 communication signal to the SDH network. In that situation, the multiplexer/demultiplexer 210 is bypassed, and the TUG-2 is sent to the SDH interface 212 as a payload. HO POH, RSOH, MSOH, and an AU PTR are added to the payload to create the SDH communication signal. The concept is similar to outputting a VTG signal to the SONET network.

The gateway 164 has a special transfer function. The gateway 164 can receive an STS-N level SONET communication signal and convert the signal to an SDH equivalent signal without demultiplexing the signal. Preferably, either the SONET interface 200 or the SDH interface 212 changes the "ss" bits and the HO POH to convert the signal. Alternatively, some other component in the gateway 164 could perform the conversion.

The gateway 164 can also convert an SDH communication signal to a SONET communication signal and provide the conversion and grooming of the payload. The conversion and grooming occur at the TUG-2 level.

The gateway 164 can receive an SDH communication signal in an STM-N format. The signal is received by the SDH interface 212. If the SDH communication signal is optical, preferably the SDH interface 212 will convert it to an electrical signal.

With continued reference to FIG. 9, the SDH interface 212 is connected to a processor 202 which controls the conversion process and reports errors in the conversion to the communication network. The SDH interface 212 separates the HO POH, RSOH, MSOH, and AU PTR from the payload. The HO POH is sent to a translator 204 where it is translated from the SDH format to the SONET format. The RSOH, MSOH, and AU PTR are terminated and the processor 202 generates SOH and LOH for the SONET network.

The SDH payload is transmitted to a multiplexer/demultiplexer 210. The multiplexer/demultiplexer 210 will demultiplex an STM-N (or converted equivalent optical signal) level communication signal to the TUG-2 level. The TUG-2 then is transmitted to the converter 208.

The converter 208 converts or maps the TUG-2s to VTGs. In addition, the converter 208 grooms the VTGs, thereby organizing them into "groups" that may be delivered to the same, similar, or close location or region. Alternatively, the TUG-2s can be groomed before they are converted to VTGs. The VTGs are then multiplexed in the multiplexer/demultiplexer 206 to an STS-N level payload. The payload is sent to the SONET interface 200.

It will be recognized that if a VTG level signal is to be transmitted out of the gateway 164 and to the SONET network, a VTG level payload will not require multiplexing. The VTG level payload then can pass through the multiplexer/demultiplexer 206 unchanged or be passed directly from the converter 208 to the SONET interface 200. Preferably, the VTG payload passes directly from the converter 208 to the SONET interface 200.

The SONET interface 200 adds the translated HO POH, the SOH, and the LOH to the payload to create a SONET communication signal. The SONET interface 200 then outputs the SONET communication signal to the SONET network. Preferably, the SONET communication signal is transmitted as an STS-N level signal or a VTG level signal.

Figure 10:
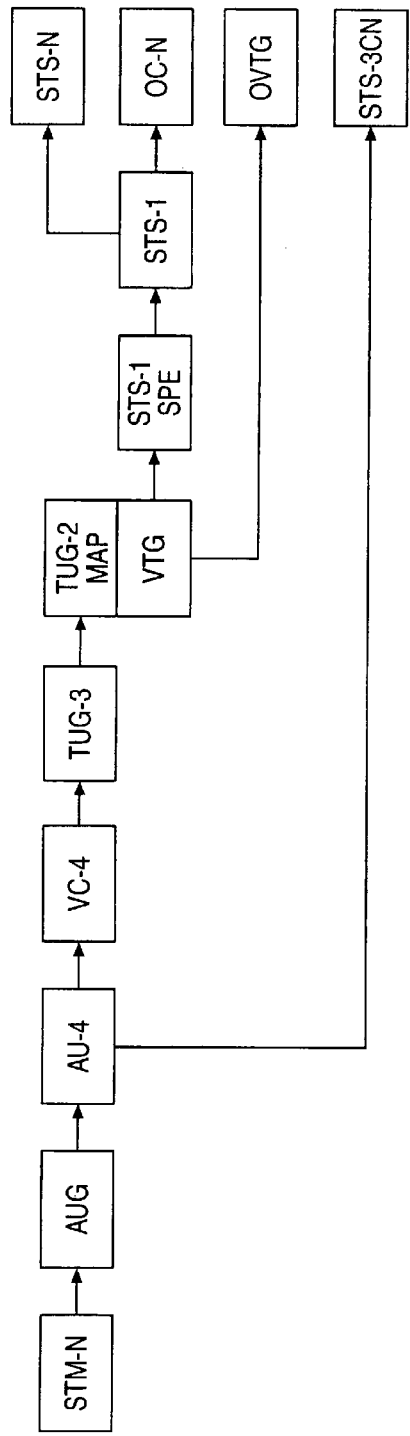
FIG. 10 is a functional diagram of a multiplexing structure for the synchronous optical network-synchronous digital hierarchy converter of FIG. 9.

The multiplexing/demultiplexing structure of the gateway 164 is illustrated in FIG. 10. Although the arrows of FIG. 10 illustrate the flow of conversion for a communication signal received through the SDH network and delivered to the SONET network, it will be appreciated that the arrows would illustrate the flow of conversion in the opposite direction for a communication signal received by the SONET network to be delivered to the SDH network.

Although embodiments of the present invention have been illustrated in the accompanying drawings and described in the detailed description, it will be understood that the invention is not limited to the embodiments disclosed, but is capable of numerous rearrangements, modifications, and substitutions of parts and elements without departing from the scope and spirit of the invention.

What is claimed is:

1. An apparatus for transmitting a communication signal in a communication network between a transmitter in a synchronous digital hierarchy network and a receiver in a synchronous optical network, the communication signal having a payload with the synchronous digital hierarchy format and wherein the communication signal comprises a regenerator section overhead, a multiplexer section overhead, and a higher order path overhead, the apparatus comprising:

a converter assembly adapted to receive the communication signal from the transmitter, to convert the payload at a tributary unit group level to form a converted payload with the synchronous optical network format, and to transmit the converted payload to the receiver in a synchronous optical network communication signal; wherein the converter assembly comprises:

a first interface adapted to receive the communication signal from the transmitter in the synchronous digital hierarchy format and to separate the higher order path overhead, the regenerator section overhead, and the multiplexer section overhead from the payload;

a converter adapted to receive the payload from the first interface and to convert the payload of the communication signal at the tributary unit group level to form the converted payload with the synchronous optical network format;

a translator adapted to receive the higher order path overhead from the first interface and to translate the higher order path overhead into the synchronous optical network format to form a translated higher order path overhead;

a processor adapted to receive the regenerator section overhead and the multiplexer section overhead from the first interface, to terminate the regenerator section overhead and the multiplexer section overhead, and to generate section overhead and line overhead; and a second interface in communication with the converter, the translator, and the processor, the second interface adapted to add the section overhead, the line overhead, and the translated higher order path overhead to the converted payload, thereby creating the synchronous optical network communication signal, the second interface further adapted to transmit the synchronous optical network communication signal to the receiver.

2. An apparatus for transmitting a communication signal in a communication network between a transmitter in a synchronous optical network and a receiver in a synchronous digital hierarchy network, the communication signal having a payload with a synchronous optical network format and wherein the communication signal has a section overhead, a line overhead, and a higher order path overhead, the apparatus comprising:

a converter assembly adapted to receive the communication signal from the transmitter, to convert the payload at a virtual tributary group level to form a converted payload having the synchronous digital hierarchy format, and to transmit the converted payload to the receiver in a synchronous digital hierarchy communication signal; wherein the converter assembly comprises:

a first interface adapted to receive the communication signal from the transmitter and to separate the higher order path overhead, the section overhead, and the line overhead from the payload;

a converter adapted to receive the payload from the first interface and to convert the payload at the virtual tributary group level to form the converted payload with the synchronous digital hierarchy format;

a translator adapted to receive the higher order path overhead from the first interface and to translate the higher order path overhead of the communication signal into a synchronous digital hierarchy format to form a translated higher order path overhead;

a processor adapted to receive the section overhead and the line overhead from the first interface, to terminate the section overhead and the line overhead, and to generate regenerator section overhead and multiplexer section overhead; and a second interface in communication with the converter, the translator, and the processor, the second interface adapted to add the regenerator section overhead, the multiplexer section overhead, and the translated higher order path overhead to the converted payload, thereby creating the synchronous digital hierarchy communication signal, the second interface further adapted to transmit the synchronous digital hierarchy communication signal to the receiver.

3. A method for transmitting a communication signal in a communication network between a transmitter in a synchronous digital hierarchy network and a receiver in a synchronous optical network, the communication signal having a payload with the synchronous digital hierarchy format and wherein the communication signal comprises a regenerator section overhead, a multiplexer section overhead, and a higher order path overhead, the method comprising:

converting the payload at a tributary unit group level to form a converted payload with a synchronous optical network format;

transmitting the converted payload to the receiver in a synchronous optical network communication signal;

separating the higher order path overhead, the regenerator section overhead, and the multiplexer section overhead from the payload prior to converting the payload;

translating the higher order path overhead into the synchronous optical network format to form a translated higher order path overhead;

terminating the regenerator section overhead and the multiplexer section overhead and generating section overhead and line overhead; and adding the section overhead, the line overhead, and the translated higher order path overhead to the converted payload, thereby creating the synchronous optical network communication signal.

4. A method for transmitting a communication signal in a communication network between a transmitter in a synchronous optical network and a receiver in a synchronous digital hierarchy network, the communication signal having a payload with a synchronous optical network format and wherein the communication signal has a section overhead, a line overhead, and a higher order path overhead, the method comprising:

converting the payload at a virtual tributary group level to form a converted payload having the synchronous digital hierarchy format;

transmitting the converted payload to the receiver in a synchronous digital hierarchy communication signal;

separating the higher order path overhead, the section overhead, and the line overhead from the payload prior to converting the payload;

translating the higher order path overhead of the communication signal into a synchronous digital hierarchy format to form a translated higher order path overhead;

terminating the section overhead and the line overhead, and generating regenerator section overhead and multiplexer section overhead; and adding the regenerator section overhead, the multiplexer section overhead, and the translated higher order path overhead to the converted payload, thereby creating the synchronous digital hierarchy communication signal.

* * * * *